United States Patent [19]
Wille et al.

[11] Patent Number: 5,121,565
[45] Date of Patent: Jun. 16, 1992

[54] INDICATOR FOR TRACKING THE CHARACTERISTICS OF A DEPLOYED FISHING LURE

[76] Inventors: Mark E. Wille, 133 Sager Ave., Oconomowoc, Wis. 53066; Richard M. Wille, Sr., 15260 Marilyn Dr., Elm Grove, Wis. 53122

[21] Appl. No.: 694,134

[22] Filed: May 1, 1991

[51] Int. Cl.⁵ .............................................. A01K 91/00
[52] U.S. Cl. ................................................ 43/4; 43/21.2
[58] Field of Search ............... 43/4, 4.5, 21.2, 17; 248/904

[56] References Cited

U.S. PATENT DOCUMENTS

| | | | |
|---|---|---|---|
| 3,365,818 | 1/1956 | Greiner | 43/4 |
| 3,786,586 | 1/1974 | Swan | 43/4 |
| 3,866,345 | 2/1975 | Gagnon | 43/4 |
| 4,050,180 | 9/1977 | King | 43/4 |
| 4,516,348 | 5/1985 | Hirose | 43/4 |
| 4,752,878 | 6/1988 | Sugurdsson | 43/4 |
| 4,793,088 | 12/1988 | Fortuna | 43/4 |
| 4,864,763 | 9/1989 | Peikin | 43/4 |

Primary Examiner—Kurt Rowan
Attorney, Agent, or Firm—Andrus, Sceales, Starke & Sawall

[57] ABSTRACT

A fishing tackle indicator includes a variable visual display of two or more kinds of indicia showing characteristics of fishing tackle used with a fishing rod, such as lure color and length of fish line deployed. Each kind of indicia may include its own linear display with an indicator manually slidable along the display to a position adjacent the indicia that describes the actual lure color or line length in use. The displays may also be combined on a common face plate with separate indicators running in tracks along opposite edges of the plate. The indicator apparatus may be combined with a spring biased clamp for easy attachment to a wide variety of objects or may be built into another piece of fishing equipment, such as a fishing rod holder.

5 Claims, 2 Drawing Sheets

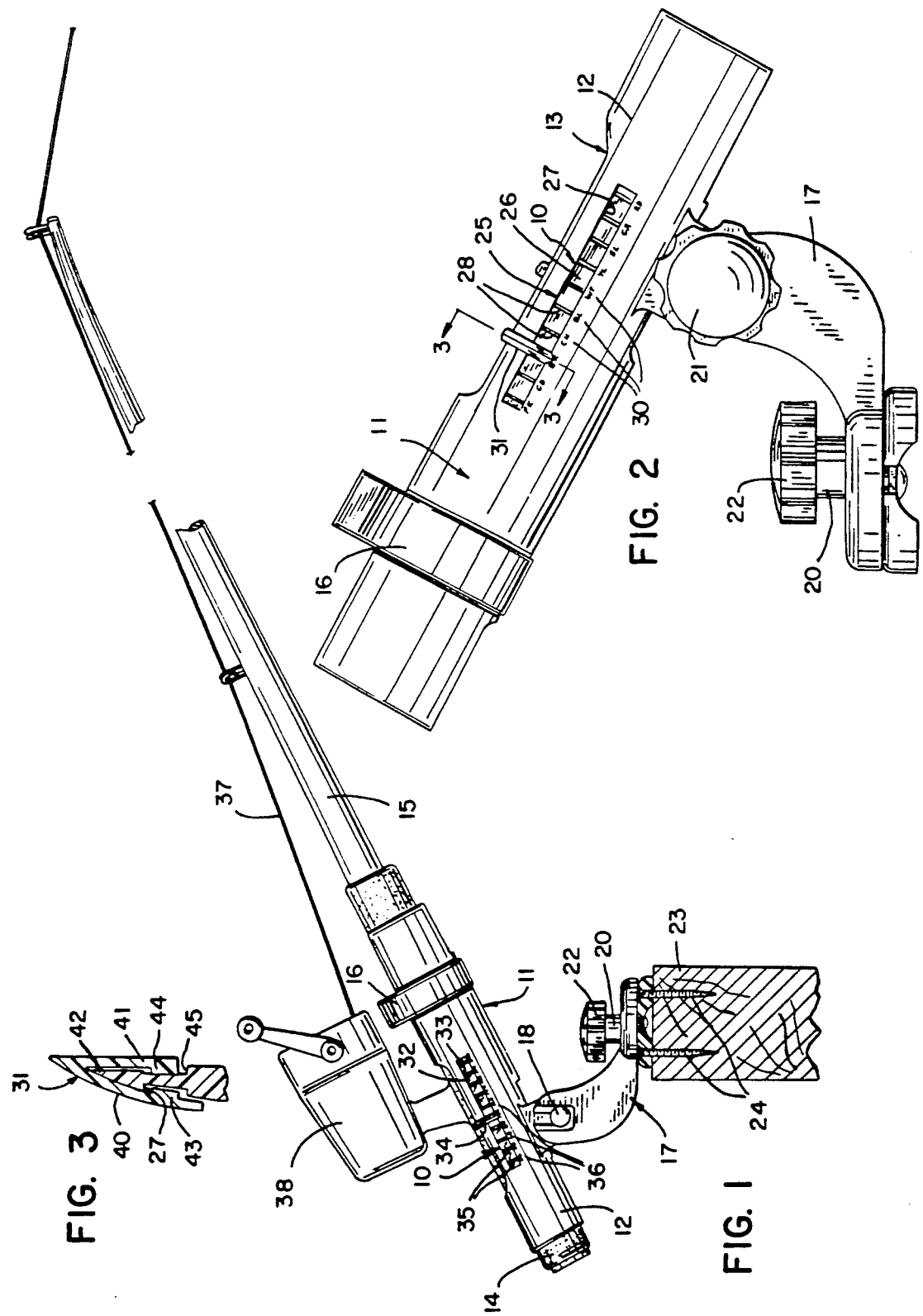

INDICATOR FOR TRACKING THE CHARACTERISTICS OF A DEPLOYED FISHING LURE

BACKGROUND OF THE INVENTION

The present invention relates to an indicator for keeping track of certain characteristics of a deployed fishing lure and, more particularly, to an indicator which is positionable directly adjacent a fishing rod to keep track of such characteristics as deployed line length and lure color.

Skilled fishermen know that fish often show a specific preference for lure color, type, or size and, furthermore, fish are often found and provide the best action at certain depth ranges. It is also known that some or all of these characteristics may vary considerably over the course of a day and, to be most successful, it is important that the fisherman be able to adapt quickly to meet changing conditions.

When fishing from a boat with multiple fishing rods and a number of fishermen, it becomes more difficult to keep track of all of the various lures or baits being used, including type, size and color, and the depths at which each of the baited lines is deployed from its fishing rod. Being able to keep track of this information allows each fisherman to more quickly convert to the most active lure and/or to adjust the length of line deployed to vary the lure depth.

It is known in the art to provide fishing reels with mechanical line length indicators to keep track of the amount of line deployed. Line markers are also sometimes used for this purpose. However, this is only one characteristic of the fishing tackle being utilized and it would be most desirable to have some means of individually indicating multiple characteristics of the deployed fishing lure, such as line length and lure color.

SUMMARY OF THE INVENTION

In accordance with the present invention a fishing tackle indicator is adapted to be mounted closely adjacent and used with an individual fishing rod to provide useful information about the lure and the deployment of the fishing line to which the lure is attached. The indicator apparatus of the present invention includes an indicator body to which are attached means for displaying varying indioia of useful characteristics of the fishing tackle, selectively positionable indicator means which may be set along the display means to indicate a specific characteristic of the fishing tackle actually being used, and means for mounting or attaching the indicator body near the fishing rod with which it is associated.

The indicia displayed on the display means may include such things as lure color, lure type, lure size, deployed line length and the like. Preferably, two displays are utilized with each indicator to show lure color and deployed line length. The display means may comprise a linear series of indicia to identify varying deployed line lengths and various lure colors. The display means may include a graduated face plate which is marked with a numbered series of uniformly increasing line lengths. The same face plate or a completely separate face plate may also be marked with visual indicia of multiple lure colors. The visual indicia of lure colors may comprise either a series of printed abbreviations of color names or an array of multiple lure colors. A combination of both abbreviations and colors may also be used.

In one embodiment, the indicator apparatus includes mounting means comprising a manually operable spring biased clamp. The clamp may operate in the manner of a conventional clothes pin wherein it includes a pair of legs each having a jaw, and a torsion spring interconnecting the legs and biasing the jaws into closed clamping contact. The lure indicator means may be conveniently attached to the opposite end of one or both clamp legs.

In another embodiment, the indicator means may be incorporated directly into a conventional tubular fishing rod holder. One type of fishing rod holder may include a cylindrical body with an axially extending open slot in a portion of the surface with the lure display comprising a pair of linear displays on the outside surface of the cylindrical rod holder body on opposite sides of the slot. The indicator means for each display may comprise a manually slidable indicator. In accordance with the preferred embodiment, each of the linear displays includes indicia of deployed line length and lure color, respectively.

BRIEF DESCRIPTION OF THE DRAWINGS

FIG. 1 is a side elevation of a portion of a fishing tackle indicator of the present invention in an embodiment incorporated into a fishing rod holder.

FIG. 2 is an enlarged outside elevation of the fishing rod holder incorporating the indicator of the present invention taken from the side opposite that shown in FIG. 1.

FIG. 3 is a partial sectional view taken on line 3—3 of FIG. 2.

DETAILED DESCRIPTION OF THE PREFERRED EMBODIMENTS

Figure 4:
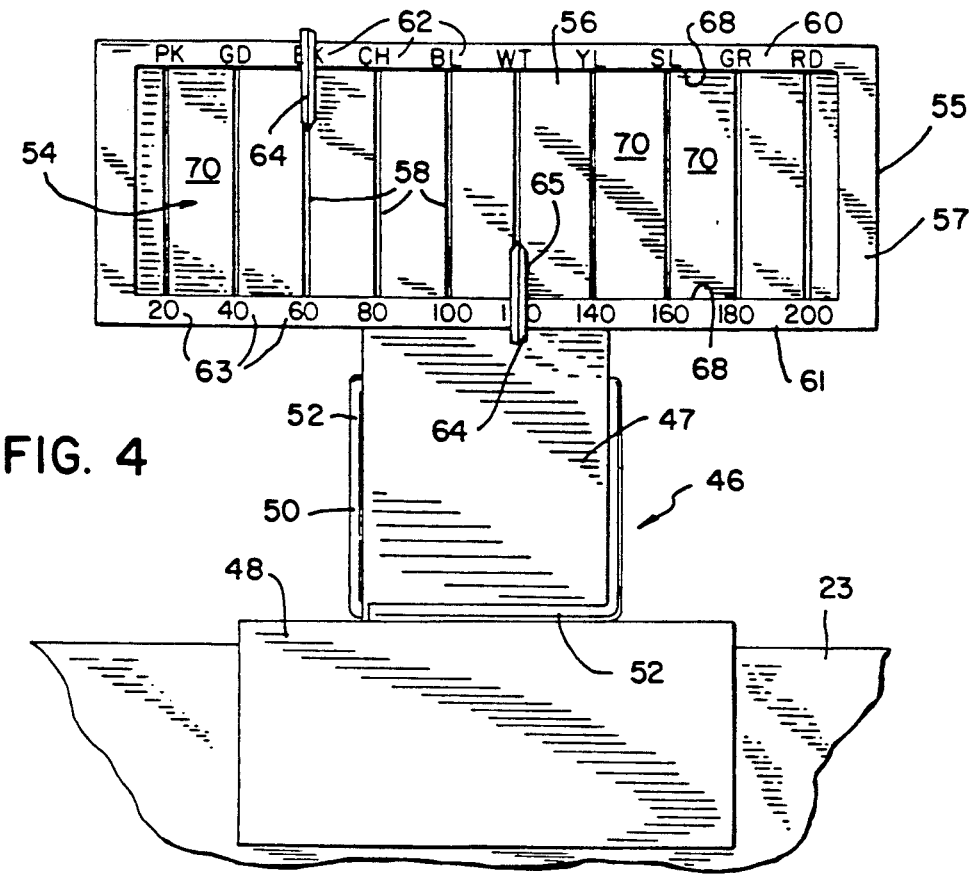
FIG. 4 is a side elevation view of another embodiment of the fishing tackle indicator of the present invention incorporated into a separate clamp.

Referring first to FIGS. 1-3, a fishing tackle indicator 10 is shown in an embodiment wherein the indicator is incorporated into a tubular fishing rod holder 11. The rod holder 11 includes a cylindrical body 12 which has an open surface portion defining a slot 13 which extends axially along the full length of the cylindrical body and into which the handle 14 of the fishing rod 15 may be inserted and held. The cylindrical body 12 may be provided with a flexible spring clip 16 which is spread apart when the rod handle is placed in the slot 13 and thereafter closes to retain the rod handle therein. The cylindrical body 12 of the rod holder may be adjustably supported in a base 17 having adjustable horizontal and vertical pivots 18 and 20, respectively, each of which includes a frictional clamping knob 21 and 22. The base 17 may be adapted to be mounted directly to the gunwale 23 of a boat with suitable mounting screws 24.

Each side of the cylindrical body 12 of the rod holder 11 on opposite sides of the slot 13 is provided with a linear display 25 which runs generally parallel to the axis of the cylindrical body and the fishing rod 15. A first linear display 26 (FIG. 2) is formed as a first rectangular recess 27 just below the slot 13 in the rod holder body 12. The first rectangular recess has a graduated display formed by a series of equally spaced lines 28. Outside of the first rectangular recess 27 and below each of the lines 28 is printed on abbreviation 30 of a lure color. The abbreviations may comprise any combination of readily recognizable letters such as PK for pink. GD for gold, YL for yellow, GR for green, and so forth. A first indicator 31 is slidably attached to the cylindrical rod holder body 12 for manual movement along the first rectangular recess 27 to selectively position the indicator at a printed abbreviation 30 corresponding to the color of lure being used. As an alternate or in addition to the printed abbreviations 30, the rectangular spaces between the lines 28 in the rectangular recess may be colored to correspond to the adjacent printed abbreviation.

On the opposite side of the cylindrical body 12 also adjacent the slot 13 is a second linear display 32 comprising a second rectangular recess 33. The second linear display is constructed in a manner identical to the first linear display 26 and includes a second slidable indicator 34 identical to the first indicator 31. The second rectangular recess is also provided with a series of equally spaced lines 35. However, the indicia used with the second linear display 32 are different and, in the embodiment shown, comprise a numbered series of uniformly increasing line lengths 36, printed or otherwise affixed to the rod holder body 12 immediately below the second rectangular recess 33. The line length indicia 36, as well as the printed abbreviations 30, may be molded into the body 12 as a part of the manufacturing process. The fisherman simply slides the second indicator 34 to the line length number 36 corresponding to the length of fish line 37 deployed from the reel 38. Experienced fishermen are often able to accurately estimate deployed line length, but other types of indicators are also available, including mechanical indicators built into the reel 38 or small markers attachable directly to the line 37. However, having a convenient and highly visible display 32 allows any fisherman in the boat to immediately determine the length of line deployed from a fishing rod 15, as well as the color of the lure being used.

Referring particularly to FIG. 3, the first indicator 31 (which is identical in construction to the second indicator 34) includes a bifurcated body having outer and inner legs 40 and 41, respectively. The indicator, which is preferably made of molded plastic, attaches over the upper edge 42 of the slot 13 in the rod holder body 12 and is retained by respective outer and inner detents 43 and 44. Outer detent 43 rides inside the first rectangular recess 27 and the inner detent 44 rides in an inner recess 45 on the opposite inside face of the cylindrical rod holder body 12. The outer leg 40, as shown, also comprises the indicator 31.

Figure 5:
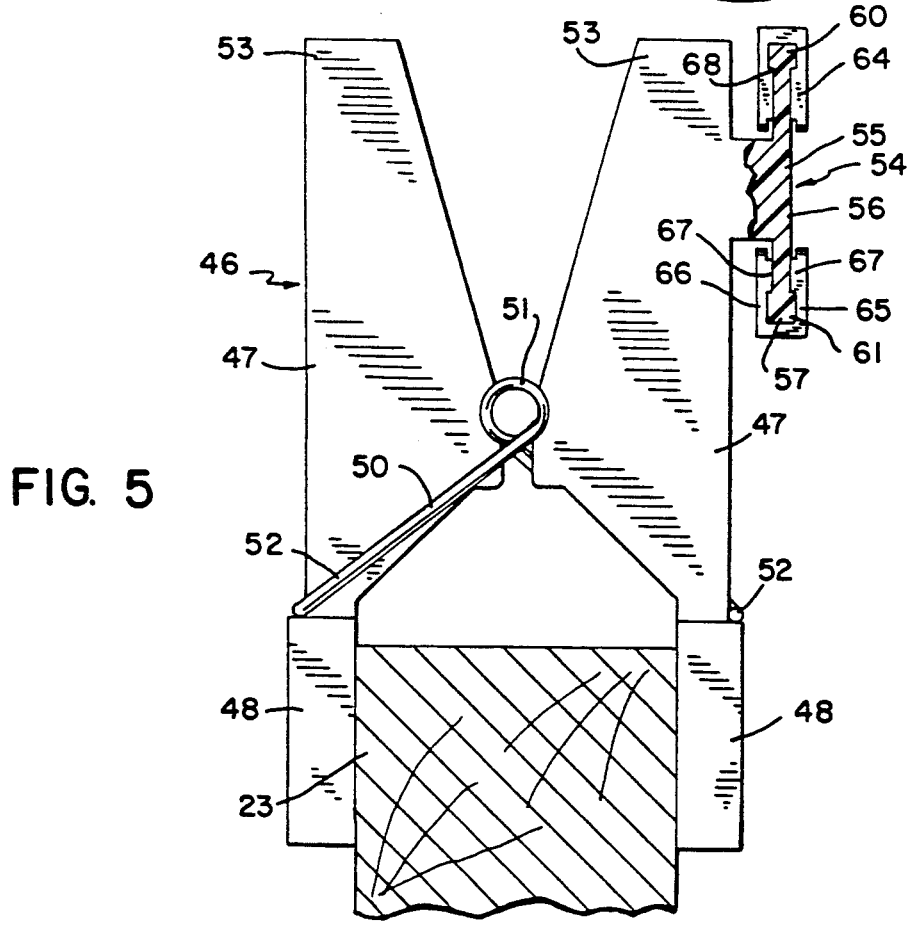
FIG. 5 is an end elevation of the indicator shown in FIG. 4.

In FIGS. 4 and 5 there is shown an embodiment of the indicator apparatus of the present invention in which the indicator is attached to a manually operable spring biased clamp 46. The clamp 46 may be constructed in a manner similar to a conventional clothes pin, including a pair of legs 47 each provided at one end with a clamping jaw 48. The legs 47 are interconnected with a torsion spring 50 having a coiled center portion 51 and a pair of angled legs 52 attached to hold the clamp legs 47 together, in a known manner, such that the jaws 48 are biased closed. The opposite ends 53 of the legs 47 are grasped and squeezed together in a known manner to open the clamp jaws for convenient attachment to, for example, the gunwale 23 of a boat.

The end 53 of one leg 47 is provided with a combined indicia display 54 comprising a pair of separate linear displays. The combined display 54 includes a face plate 55 molded integrally with the clamp leg 47 and having a generally rectangular outer frame 57 defining a large rectangular interior recess 56. The recess 56 may be provided with a series of equally spaced, vertically extending parallel lines 58 forming graduations for the indicia to be displayed.

The upper and lower edges 60 and 61, respectively, of the outer frame 57 are provided with the same linear series of indicia used in the first and second displays 26 and 32 of the previously described embodiment. Thus, the upper edge 60 includes printed abbreviations 62 of the colors of lures and the lower edge 61 includes the series of numbers designating incrementally increasing line lengths 63. A pair of identical indicators 64 are attached to the face plate 55, one along the upper edge 60 and the other along the lower edge 61. Each indicator 64 is constructed in a manner somewhat like the indicators 31 and 34 of the previously described embodiment. Thus, each indicator 64 is preferably molded of plastic and includes an outer indicator leg 65 and an inner retaining leg 66 each of which is provided with an oppositely facing detent 67 adapted to engage the widened edge of the outer frame 57 and run along the upper and lower tracks 68 defined by the interface between the upper and lower edges 60 and the common interior recess 56.

The combined display 54 otherwise operates in the same manner as separate displays previously described. As in the other embodiment, each of the vertically elongate rectangles 70 defined by the parallel lines 58 in the interior recess 56 may be covered with a colored adhesive patch corresponding to an adjacent color abbreviation 62 on the upper edge 60. Alternate means of coloring the rectangles 70 may also be utilized.

The indicator apparatus using the clamp 46 has somewhat broader adaptability than the embodiment of FIGS. 1-3 incorporated directly into the rod holder 11. The clamp 46 may be easily attached to a wide variety of objects, including fishing rod 15 itself. Also, both legs 47 of the clamp may be provided with a combined display 54, allowing the clamp to display four different indicia for a single fishing rod or to display two identical sets of indicia pairs for two adjacent fishing rods.

Various modes of carrying out the present invention are contemplated as being within the scope of the following claims particularly pointing out and distinctly claiming the subject matter which is regarded as the invention.

We claim:

1. A fishing tackle indicator apparatus for use with a fishing rod, said indicator apparatus comprising:
   an indicator body;
   display means on said body for displaying varying indicia of characteristics of fishing tackle usable with the fishing rod;
   indicator means attached to said body and selectively positionable with respect to said display means for indicating a characteristic specific to the fishing tackle actually being used; and,
   means for mounting said indicator body near the fishing rod, said mounting means comprising a manually operable, spring biased clamp.

2. The apparatus as set forth in claim 1 wherein said clamp comprises a pair of legs each including a jaw on one end, and a torsion spring interconnecting said legs and biasing said jaws into clamping contact.

3. The apparatus as set forth in claim 2 wherein said display means and indicator means are attached to an end of one of said legs opposite the jaw.

4. A fishing tackle indicator apparatus for use with a fishing rod, said indicator apparatus comprising:
- an indicator body;
- display means on said body for displaying varying indicia of characteristics of fishing tackle usable with the fishing rod;
- indicator means attached to said body and selectively positionable with respect to said display means for indicating a characteristic specific to the fishing tackle actually being used;
- means for mounting said indicator body near the fishing rod, said mounting means comprising a tubular holder for the fishing rod;
- said tubular holder including a cylindrical body having an axially extending open surface portion, and wherein said display means comprises a pair of linear displays in the outer surface of said cylindrical body on opposite sides of said open surface portion, and said indicator means comprises a manually slidable indicator for each of said linear displays.

5. The apparatus as set forth in claim 4 wherein said linear displays include indicia respectively of deployed line length and lure color.

* * * * *